United States Patent
Coles et al.

(10) Patent No.: US 8,376,267 B2
(45) Date of Patent: Feb. 19, 2013

(54) LANDING GEAR WITH LOCKING STEERING SYSTEM

(75) Inventors: John W. C. Coles, Ontario (CA); Paul J. Lavigne, Ontario (CA)

(73) Assignee: Goodrich Corporation, Charlotte, NC (US)

( * ) Notice: Subject to any disclaimer, the term of this patent is extended or adjusted under 35 U.S.C. 154(b) by 1119 days.

(21) Appl. No.: 11/570,855

(22) PCT Filed: Jun. 20, 2005

(86) PCT No.: PCT/US2005/021632
§ 371 (c)(1),
(2), (4) Date: Mar. 27, 2009

(87) PCT Pub. No.: WO2006/071262
PCT Pub. Date: Jul. 6, 2006

(65) Prior Publication Data
US 2010/0078517 A1    Apr. 1, 2010

Related U.S. Application Data

(60) Provisional application No. 60/580,935, filed on Jun. 18, 2004.

(51) Int. Cl.
*B64C 25/50*    (2006.01)
(52) U.S. Cl. .................. 244/50; 244/100 R; 244/103 R
(58) Field of Classification Search .................. 244/50, 244/100 R, 103 R; *B64C 25/50*
See application file for complete search history.

(56) References Cited

U.S. PATENT DOCUMENTS

| | | | | |
|---|---|---|---|---|
| 2,851,231 A * | 9/1958 | Westcott, Jr. | ............. | 244/103 R |
| 2,930,552 A * | 3/1960 | Hartel | ........................ | 244/103 R |
| 2,943,820 A * | 7/1960 | Westcott, Jr. | .................... | 244/50 |
| 2,970,792 A * | 2/1961 | Holmes | ........................... | 244/50 |
| 3,488,020 A * | 1/1970 | Scherer | ............................ | 244/50 |
| 3,556,440 A * | 1/1971 | Lallemant | ................. | 244/104 R |
| 3,643,898 A * | 2/1972 | Whitener et al. | ............... | 244/50 |
| 4,659,040 A * | 4/1987 | Sinclair | ....................... | 244/103 S |
| 5,207,398 A * | 5/1993 | Veaux et al. | ............. | 244/100 R |
| 5,242,131 A * | 9/1993 | Watts | ....................... | 244/103 W |
| 5,333,816 A | 8/1994 | Del Monte et al. | | |
| 5,429,323 A | 7/1995 | Derrien et al. | | |
| 5,460,340 A | 10/1995 | White | | |
| 5,513,821 A * | 5/1996 | Ralph | ............................. | 244/50 |

(Continued)

FOREIGN PATENT DOCUMENTS

GB    505109    5/1939

OTHER PUBLICATIONS

European Search Report for application No. EP 08 15 7465 completed Jul. 1, 2008.

*Primary Examiner* — Tien Dinh
*Assistant Examiner* — Michael Kreiner
(74) *Attorney, Agent, or Firm* — Edwards Wildman Palmer LLP; Scott D. Wofsy; Joshua L. Jones

(57) ABSTRACT

A landing gear system for an aircraft comprises a truck beam (22); at least one steerable axle (42) mounted to the truck beam for pivotal steering movement; a steering actuator (46) connected to the steerable axle; and a locking mechanism (60) including a locking groove member (62) provided on the steerable axle for pivotal movement therewith, and a locking wedge member (64) engageable with the locking groove member to prevent pivotal movement of the steerable axle. The locking groove member includes a slot (63) having opposed sides converging towards one another, and the locking wedge member has correspondingly converging sides for mating engagement in the slot. The locking wedge member is resiliently biased (66, 69) into engagement with the locking groove member and the locking wedge member is mounted to the truck beam for pivotal movement (70).

20 Claims, 5 Drawing Sheets

U.S. PATENT DOCUMENTS

| | | | | |
|---|---|---|---|---|
| 5,595,359 A | * | 1/1997 | Meneghetti | 244/50 |
| 5,613,651 A | * | 3/1997 | Meneghetti | 244/50 |
| 5,704,568 A | * | 1/1998 | Watts | 244/50 |
| 6,065,719 A | * | 5/2000 | Ralph | 244/50 |
| 6,123,292 A | * | 9/2000 | Ralph | 244/50 |
| 6,149,100 A | * | 11/2000 | Ralph | 244/103 R |
| 6,173,920 B1 | | 1/2001 | Meneghetti | |
| 6,345,564 B1 | | 2/2002 | Kilner et al. | |
| 6,354,537 B1 | * | 3/2002 | Ralph | 244/102 R |
| 6,575,405 B2 | | 6/2003 | Bryant et al. | |

\* cited by examiner

LANDING GEAR WITH LOCKING STEERING SYSTEM

RELATED APPLICATION

This application claims the benefit of U.S. Provisional Application No. 60/580,935 filed Jun. 18, 2004, which is hereby incorporated herein by reference.

FIELD OF THE INVENTION

The present invention relates to multi-wheel landing gear for large aircraft and particularly to a landing gear truck or bogie having steerable wheels.

BACKGROUND OF THE INVENTION

Large aircraft, for example of the wide-body type, typically employ multi-wheel landing gear or landing gear trucks. To prevent tire scrubbing, and hence tire wear, during taxiing, such multi-wheel landing gear typically are provided with some form of steering. For example, the multi-wheel landing gear may include multiple pairs of wheels mounted on respective axles carried by a beam (commonly referred to as a bogie beam), and either the rear axle, or both forward and rear axles, on the truck is steerable. Each steerable axle may be operated by one or two hydraulic actuators typically controlled by the nose gear steering system. U.S. Pat. Nos. 5,595, 359 and 5,613,651 disclose steerable landing gear wherein each steerable axle is driven by a single center-locked actuator.

During landing and take-off, each steerable axle preferably is locked against turning. For this purpose, the actuator may be internally locked in its center stroke position as described in U.S. Pat. No. 5,595,359. In U.S. Pat. No. 5,242,131, such function was provided by a separate external hydraulic plunger-lock mechanism.

The external locking mechanism described in U.S. Pat. No. 5,242,131 has several drawbacks. Such mechanism included a plunger pin movable by hydraulic pressure into an aperture in a tongue provided on the steerable axle. Consequently, hydraulic pressure is required to engage the locking mechanism. Thus, if hydraulic pressure is lost, the locking mechanism cannot be engaged. In the event of a loss of hydraulic pressure after the locking mechanism has been engaged, the plunger pin could possibly become dislodged from the aperture and no longer hold the steerable axle against swivelling.

SUMMARY OF THE INVENTION

The present invention provides a landing gear system for an aircraft that overcomes one or more drawbacks associated with prior art landing gear to systems that include a mechanism for locking a steerable axle in a centered position during landing and/or takeoff, or other high speed operations.

According to one aspect of the invention, a landing gear system for an aircraft comprises a truck beam; at least one steerable axle mounted to the truck beam for pivotal steering movement about a steering axis; a steering actuator connected to the steerable axle; and a locking mechanism including a first locking member provided on the steerable axle for pivotal movement therewith, and a second locking member engageable with the first locking member to prevent pivotal movement of the steerable axle, wherein one of the first and second locking members includes a slot having opposed sides converging towards one another, and the other of the first and second locking members has correspondingly converging sides for mating engagement in the slot.

In a preferred embodiment the opposed sides of the slot extend substantially radially with respect to the steering axis of the steerable axle.

According to another aspect of the invention, a landing gear system for an aircraft comprises a truck beam; at least one steerable axle mounted to the truck beam for pivotal steering movement about a steering axis; a steering actuator connected to the steerable axle; and a locking mechanism including a first locking member provided on the steerable axle for pivotal movement therewith, and a second locking member engageable with the first locking member to prevent pivotal movement of the steerable axle, wherein the second locking member is resiliently biased into engagement with the first locking member.

According to a further aspect of the invention, a landing gear system for an aircraft comprises a truck beam; at least one steerable axle mounted to the truck beam for pivotal steering movement about a steering axis; a steering actuator connected to the steerable axle; and a locking mechanism including a first locking member provided on the steerable axle for pivotal movement therewith, and a second locking member engageable with the first locking member to prevent pivotal movement of the steerable axle, wherein the second locking member is mounted to the truck beam for pivotal movement.

The foregoing and other features of the invention are hereinafter fully described and particularly pointed out in the claims, the following description and the annexed drawings setting forth in detail one or more illustrative embodiments of the invention, such being indicative, however, of but one or a few of the various ways in which the principles of the invention may be employed.

DETAILED DESCRIPTION

Figure 1:
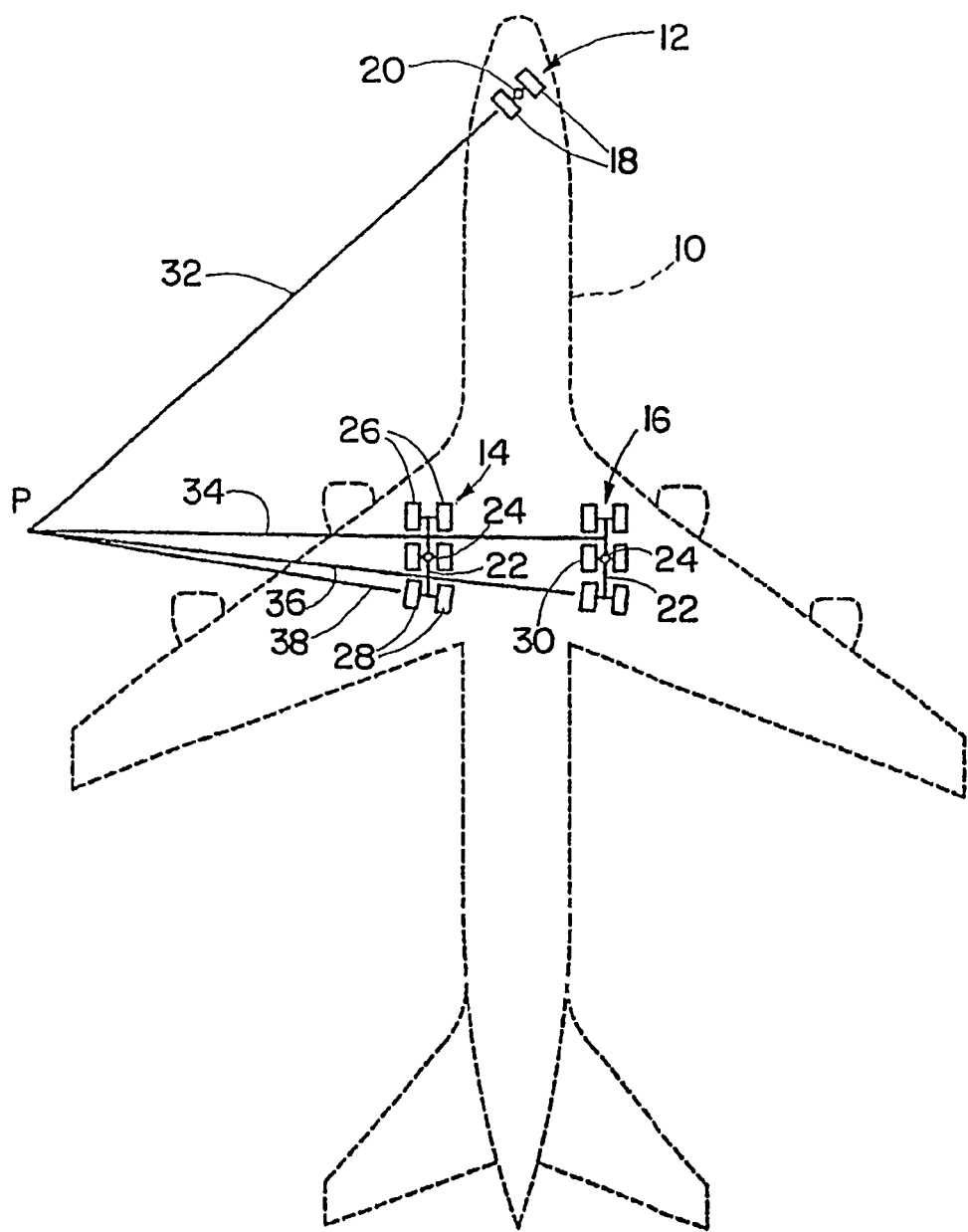
FIG. 1 is a schematic plan view of a large aircraft illustrating a typical landing gear arrangement.

Referring initially to FIG. 1, an exemplary airplane 10 is illustrated in broken lines. The airplane is equipped with a nose wheel landing gear 12 and main landing gear comprising trucks (also known as bogies) 14 and 16 disposed at opposite sides of the airplane body. The nose wheel landing gear 12 comprises a pair of wheels 18 that are steerable as a unit in response to pilot controls. The trucks 14 and 16 each comprise an elongated truck (bogie) beam 22 extending parallel to the longitudinal axis of the airplane and positionable below the body of the airplane on a retractable strut 24 in the manner understood by those skilled in the art.

As shown, each truck or bogie 14, 16 is provided with a plurality of support wheels mounted in pairs on the bogie beam by respective axles. The wheels 26 of a first pair are coaxial with one another and located forwardly on the beam, e.g. at the forward end of the beam, and the wheels 28 of a second pair are coaxial with one another and located rearwardly on the beam 22, e.g. at the rearward end thereof. The wheels 30 of a third pair are also coaxial with one another and mounted on beam 22 between the first pair and the second pair.

While each main landing gear comprises a six wheel, three axle, bogie-type truck in the illustrated example, the number of wheels can be varied as desired. For example, a four wheel truck could be employed, or an eight wheel truck. Also, the airplane 10 could be equipped with a different number of trucks. For example, a very large aircraft could be equipped with two inboard and two outboard main landing gear trucks.

To reduce tire scrubbing and thus reduce wear of the tires, one or more pairs of wheels on the truck are steerable. Usually this will be either the pair forwardly on the truck or rearwardly on the truck, or both. To this end, the beam 22 is provided with means for mounting a steerable pair of wheels for rotation as a unit about a vertical axis fixed with respect to retractable beam 22. While either the forward pair of wheels 26 or the rearward pair of wheels 28, or both, can be selected for steering, usually the rearward pair of wheels 28 is steerable. The steerable wheels, or axles, can be controlled by suitable pilot operation controls coordinated with the nose wheel landing gear 12.

In FIG. 1, the point P is the point about which the airplane can rotate in executing a turn and thus is the common center of turning radii for the nose wheel landing gear 12 and the average turning radii for the remaining four wheel portions of the main landing gear having associated therewith the turning radii 32, 34, 36 and 38 for the illustrated aircraft.

The above-described landing gear arrangement is merely exemplary of the landing gear configurations to which the principles of the present invention can be applied. More generally, the principles of the present invention can be applied to any landing gear including a steerable axle.

Figure 2:
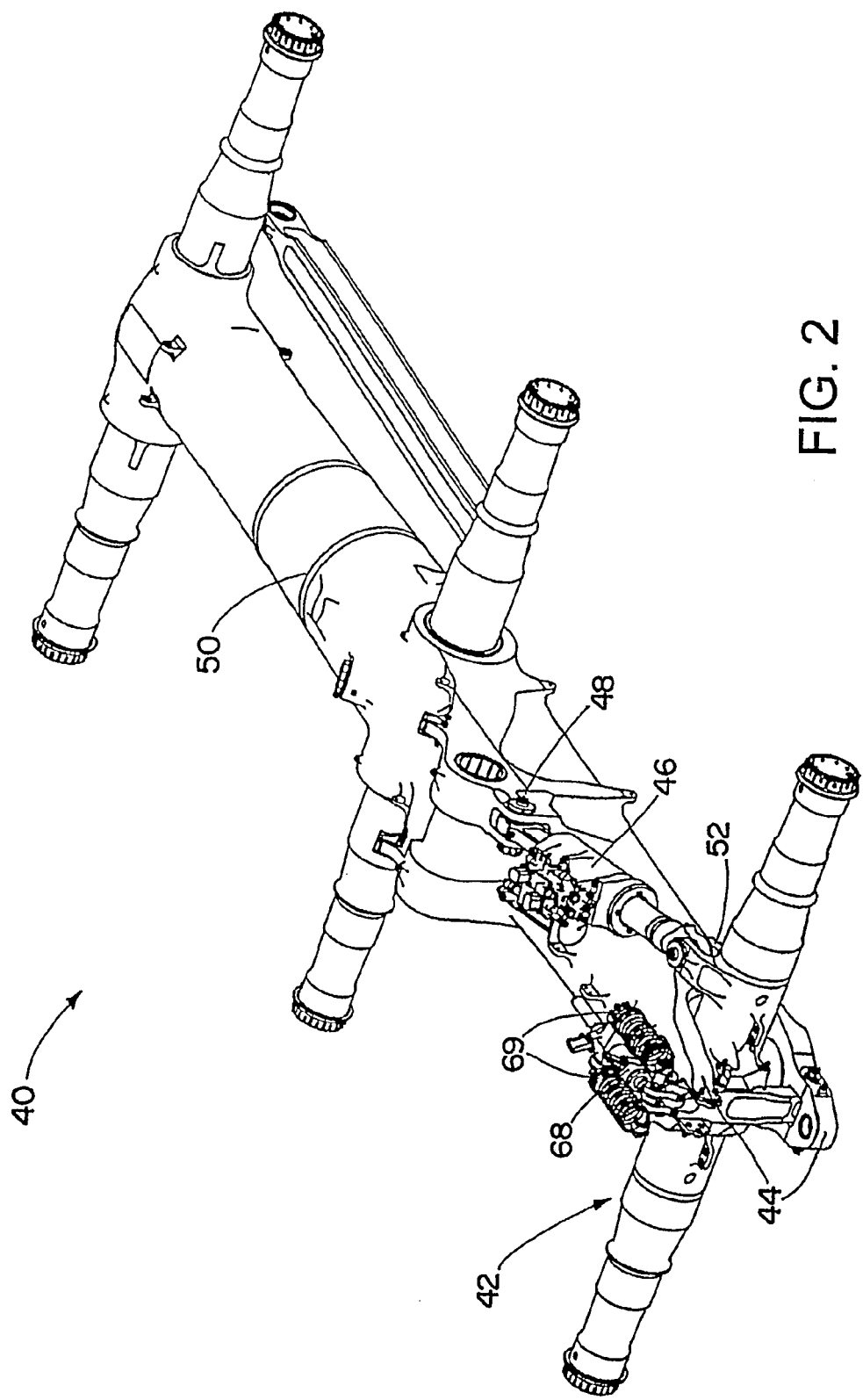
FIG. 2 is a perspective view of a landing gear truck illustrating a locking mechanism for a steerable axle according to the present invention.

In FIG. 2, a steerable axle 42 of an exemplary landing gear truck 40 is illustrated. Any suitable means can be employed for mounting the axle in the truck for steering movement. In the illustrated landing gear truck 40, a truck beam 50 can have formed at its end a fork 44 in which the steerable axle 42 is mounted for pivotal movement about a steering axis perpendicular to the longitudinal axis of the truck beam 50. In addition, any suitable means can be employed to rotate, i.e. steer, the steerable axle, such as the actuator 46. The illustrated steering actuator 46 is a hydraulic piston-cylinder assembly that is connected at is cylinder end to mounting clevis 48 on the truck beam 50 and at its piston end to a mounting clevis 52 on the steerable axle 42. As will be appreciated, extension and retraction of the actuator 46 will rotate the axle 42 clockwise and counter-clockwise about the steering axis. In this manner, wheels (not shown) mounted on opposite ends of the axle 42 can be controllably steered. In FIG. 2, the axle 42 is shown in its center position where the longitudinal axis of the axle 42 is perpendicular to the longitudinal axis of truck beam 50.

During taxiing and/or other low speed maneuvers, the steerable axle 42 can be rotated by the steering actuator 46 to effect steering of the steerable axle 42. During landing and/or takeoff, or other high speed maneuvers, the steerable axle 42 can be locked in its center position by a locking mechanism 60 according to the present invention. An exemplary locking mechanism according to the invention is shown in greater detail in FIGS. 3-7.

Figure 3:
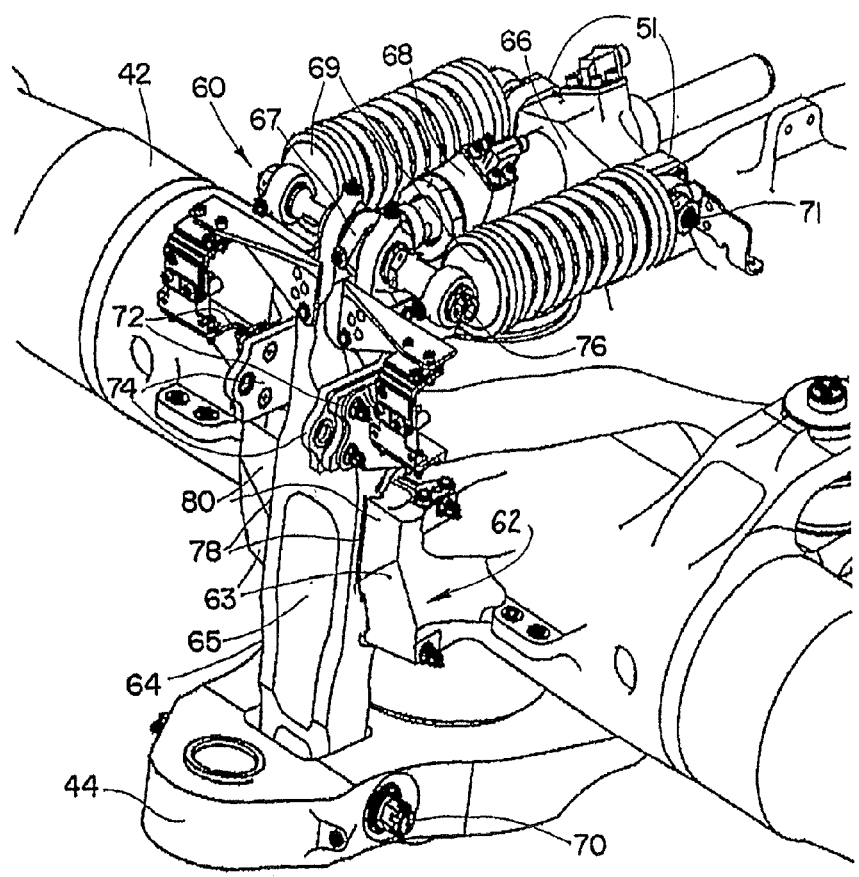
FIG. 3 is an enlarged portion of FIG. 2.
Figure 4:
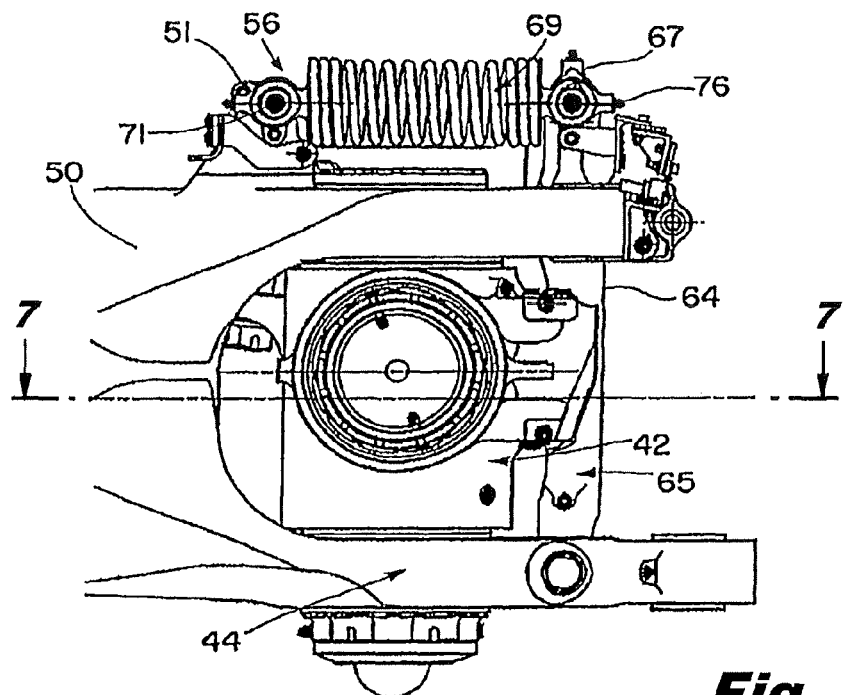
FIG. 4 is a side view of the locking mechanism.
Figure 5:
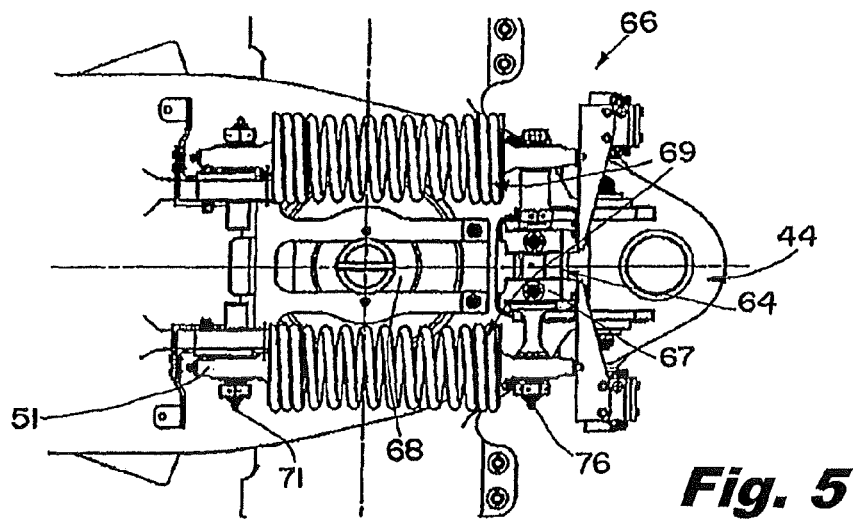
FIG. 5 is an top view of the locking mechanism.
Figure 6:
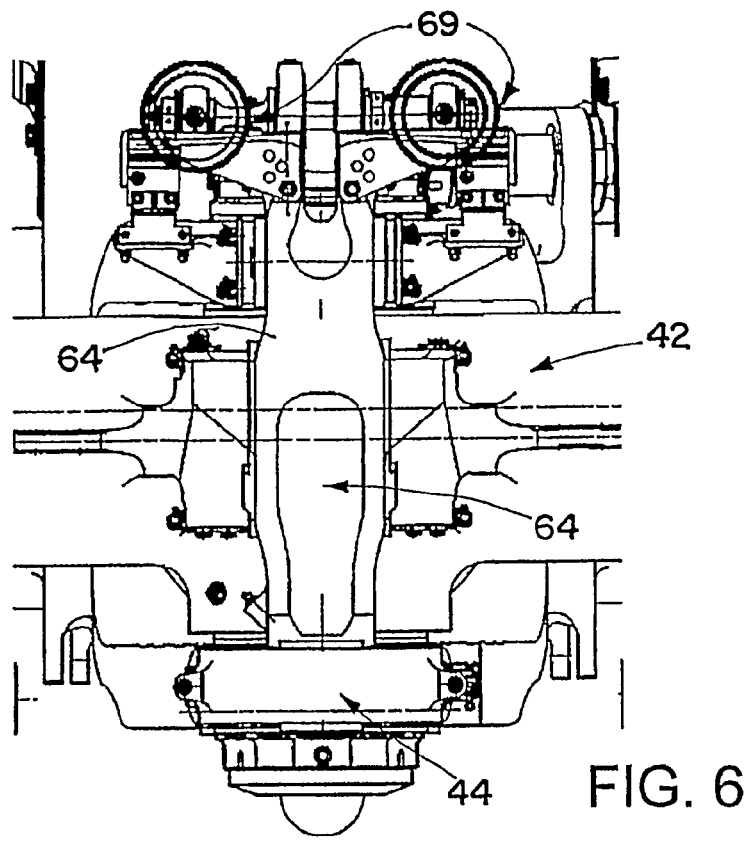
FIG. 6 is an end view of the locking mechanism.
Figure 7:
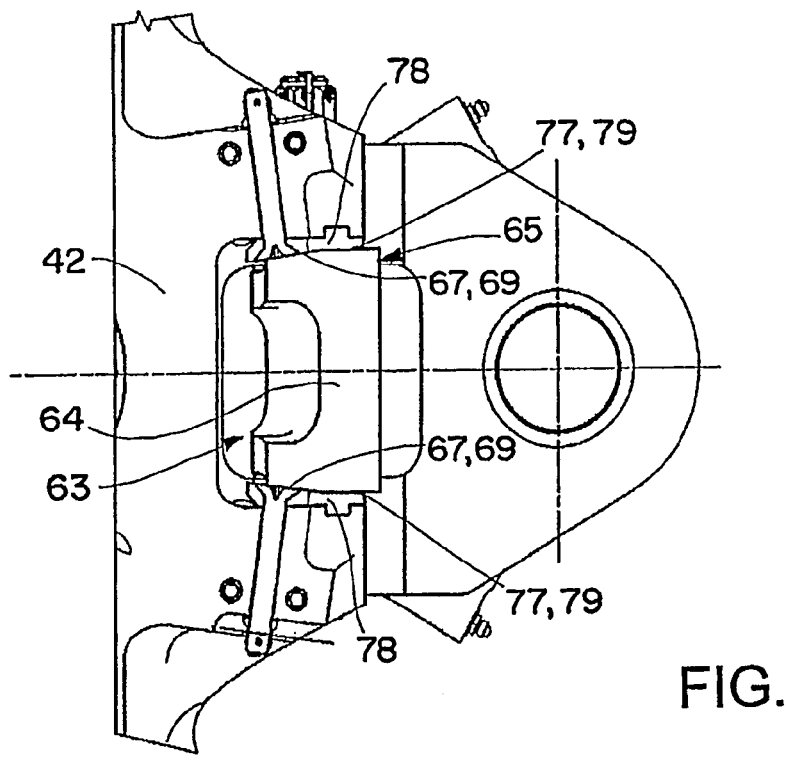
FIG. 7 is a cross-sectional view of the locking mechanism, taken along the line 7-7 of FIG. 5.

Turning now to FIG. 3, the locking mechanism 60 for the steerable axle 42 comprises a locking groove member 62 provided on the steerable axle 42 for pivotal movement therewith, and a locking wedge member 64 engageable with the locking groove member 62 to prevent pivotal movement of the steerable axle 42. The locking groove member 62 includes a slot 63 (FIG. 7) having opposed sides 67 converging towards one another, and the locking wedge member 64 has a tapered engagement portion (herein also referred to as a locking wedge portion 65) with correspondingly converging sides 69 for mating engagement in the slot. In the illustrated embodiment, the locking groove member 62 is in the form of a clevis integral with the steerable axle 42 and located centrally on the axle at its hub. The clevis (locking groove member) 62 includes the slot in the form of a groove, and the locking wedge member 64 is mounted to the truck beam 50 for movement towards and away from the clevis.

The locking wedge member 64 is resiliently biased towards the locking groove member 62 by a biasing assembly 66, and a locking mechanism actuator 68 is provided for relatively moving the locking groove member 62 and the locking wedge member 64 apart to disengage the locking wedge portion 65 from the slot in the locking groove member 62.

Preferably, the locking wedge member 64 is mounted to the truck beam 50 for pivotal movement about a pivot axis. More particularly, one end of the locking wedge member 64 is connected by a pivot pin 70 to a projecting end of the bottom arm of the fork 44 in which the steering axle 42 is mounted. The opposite end of the locking wedge member 64 is connected to the biasing assembly 66. Consequently, the locking wedge portion 65 is located between the pivot end of the locking wedge member 64 and the free end thereof connected to the biasing assembly 66. As shown, the free end of the locking wedge member 64 is guided for movement along the axis of the truck beam 50 in a guide channel formed by a pair of laterally spaced apart brackets 72 attached to the truck beam 50. The brackets 72 preferably are provided with wear plates 74 on the inner sides thereof that engage the side edges of the locking wedge member 64.

The biasing assembly 66 includes at least one and preferably two lock springs 69 each connected at one end by a pin 71 to a clevis 51 on the truck beam 50. The opposite end of each lock spring 69 is connected by a pin 76 to a clevis 67 at the free end of the locking wedge member 64. The springs 69 are located on opposite sides of the locking mechanism actuator 68 which also is connected by the pin 71 to the clevis 51 on the truck beam 50 and by the pin 76 to the clevis 67 on the locking wedge member 64. The springs 69 are tensioned as needed to hold the locking wedge portion 65 seated in the slot in the locking groove member 62.

To unseat the locking wedge member 64 to permit steering of the steerable axle 42, the locking mechanism actuator 68 is extended by application of hydraulic pressure to the extend side of the actuator cylinder via suitable porting and supply lines (not shown). The actuator 68 can also be retracted by connecting the retract side of the cylinder to hydraulic pressure, when the locking wedge member 64 is to be engaged in the slot. While the springs 69 alone may be sufficient to seat the locking wedge member 64, preferably the locking wedge member 64 is driven by the actuator 68 into the slot to ensure full seating in the slot and further to assist in breaking away any debris such as ice accumulation in the slot and/or on the locking wedge member 64. As shown, the narrow end of the locking wedge member 64 and slot preferably are extended to provide a suitably sized gap therebetween when the locking wedge portion 65 is seated in the slot, this facilitating the falling away of ice.

The opposed sides 67 of the slot in the locking groove member 62 extend substantially radially with respect to the steering axis of the steerable axle 42 and generally radially with respect to the center of the truck beam 50 coinciding with the attachment location of the truck beam 50 to the landing gear strut. More particularly, the locking wedge member 64 and locking groove member 62 are configured such that the reaction faces thereof are substantially normal to the expected load application. This reduces the loads acting on the lock springs 69 and locking mechanism actuator 68. In addition, the locking wedge member 64 and locking groove member 62 can be provided with parallel surfaces 77, 79 outwardly adjacent the converging surfaces 67, 69 for further reacting unlocking loads.

The opposed sides 67 of the slot 63 preferably are formed by replaceable wear plates 78. Together the opposed sides can form an included angle of between about 5 degrees and about 20 degrees and more preferably an included angle of about 10 degrees.

When it is desired to turn the steering axle 42 and the pair of wheels mounted thereon by means of the hydraulic actuator, pressurized fluid is supplied to the extend side of the locking mechanism cylinder 68. This will extend the actuator piston rod and thereby move the wedge portion 65 of the locking wedge member 64 clear of the slot 63 so that the axle 42 is free to turn. Physical stops 81 can be provided on the truck beam 50 to limit the extent of axle turning to less than that which would cause undesirable bottoming of the piston in the locking mechanism cylinder. In the event hydraulic pressure is lost, the lock springs 69 will function to pull the locking wedge member 64 toward the locking groove member 62. If the locking wedge member 64 is within the capture angle of the slot in the locking groove member 62, the locking wedge portion 65 will be pulled into and seated in the slot. If the locking wedge 64 is outside the capture angle of the slot, the locking wedge member 64 will engage and slide one of the cam faces 80 provided at the outer ends of the laterally spaced apart arms of the clevis 63, until the locking wedge portion 65 moves inside the capture angle of the slot. Accordingly, under failure conditions, the locking mechanism 60 can become engaged to prevent turning of the steering angle. Moreover, once engaged, the locking mechanism 60 will remain engaged, even if hydraulic pressure is lost.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described integers (components, assemblies, devices, compositions, etc.), the terms (including a reference to a "means") used to describe such integers are intended to correspond, unless otherwise indicated, to any integer which performs the specified function of the described integer (i.e., that is functionally equivalent), even though not structurally equivalent to the disclosed structure which performs the function in the herein illustrated exemplary embodiment or embodiments of the invention. In addition, while a particular feature of the invention may have been described above with respect to only one of several illustrated embodiments, such feature may be combined with one or more other features of the other embodiments, as may be desired and advantageous for any given or particular application.

The invention claimed is:

1. A landing gear system for an aircraft comprising a truck beam; at least one steerable axle mounted to the truck beam for pivotal steering movement about a steering axis; a locking mechanism including a first locking member provided on the steerable axle for pivotal movement therewith, and a second locking member engageable with the first locking member to prevent pivotal movement of the steerable axle; wherein one of the first and second locking members includes a slot having opposed sides converging towards one another, and the other of the first and second locking members has a tapered portion with correspondingly converging sides for mating engagement in the slot; wherein a portion of the steering axle is between the steering axis and the first and second locking members.

2. A landing gear system as set forth in claim 1, wherein the opposed sides of the slot extend generally radially with respect to the steering axis of the steerable axle.

3. A landing gear system as set forth in claim 1, wherein the opposed sides of the slot are formed by replaceable wear plates.

4. A landing gear system as set forth in claim 1, wherein the steerable axle has integrally formed therein a clevis including the slot.

5. A landing gear system as set forth in claim 1, wherein the opposed sides of the slot form an included angle of between about 5 degrees and about 20 degrees.

6. A landing gear system as set forth in claim 1, wherein the opposed sides of the slot extend substantially radially with respect to the steering axis of the steerable axle.

7. A landing gear system as set forth in claim 1, wherein the second locking member is resiliently biased towards the first locking member for holding the tapered portion of the first locking member engaged in the slot.

8. A landing gear system as set forth in claim 7, wherein the slot is formed in a clevis including laterally spaced apart arms extending radially with respect to the steering axis and having at their radially outer ends cam faces against which the first locking member slides if not captured in the slot.

9. A landing gear system as set forth in claim 8, further comprising a locking mechanism actuator for relatively moving the first and second locking members apart to disengage the tapered portion of the second locking member from the slot in the first locking member.

10. A landing gear system as set forth in claim 1, wherein the second locking member is mounted to the steerable axle for pivotal movement about a pivot axis.

11. A landing gear system as set forth in claim 10, comprising at least one resilient member connected to the second locking member for resiliently biasing the second locking member towards the first locking member, and the resilient member is connected to an end of the second locking member opposite the pivot axis.

12. A landing gear system as set forth in claim 11, wherein the tapered portion of the second locking member is located between the pivot axis and the end to which the resilient member is connected.

13. A. landing gear system as set forth in claim 12, wherein the resilient member is connected between the second locking member and the truck beam.

14. A landing gear system as set forth in claim 1, further comprising a steering actuator connected between the steerable axle and the truck beam.

15. A landing gear system for an aircraft comprising a truck beam; at least one steerable axle mounted to the truck beam for pivotal steering movement about a steering axis; a locking mechanism including a first locking member provided on the steerable axle for pivotal movement therewith, and a second locking member engageable with the first locking member to prevent pivotal movement of the steerable axle; wherein the second locking member is resiliently biased into engagement with the first locking member, and when the first and second locking members are engaged, the steerable axle is locked against pivotal steering movement; wherein a portion of the steering axle is between the steering axis and the first and second locking members.

16. A landing gear system as set forth in claim 15, wherein one of the first and second locking members includes a slot having opposed sides converging towards one another, and the other of the first and second locking members has a tapered portion with correspondingly converging sides for mating engagement in the slot.

17. A landing gear system for an aircraft comprising a truck beam; at least one steerable axle mounted to the truck beam for pivotal steering movement about a steering axis; a locking mechanism including a first locking member provided on the steerable axle for pivotal movement therewith, and a second locking member engageable with the first locking member to prevent pivotal movement of the steerable axle; wherein the second locking member is mounted to the truck beam for pivotal movement about a pivot axis generally perpendicular to the steering axis; wherein a portion of the steering axle is between the steering axis and the first and second locking members.

18. A landing gear system as set forth in claim 17, wherein at least one resilient member is connected to the second locking member for resiliently biasing the second locking member towards the first locking member, and the resilient member is connected to an end of the second locking member opposite the pivot axis.

19. A landing gear system as set forth in claim 18, wherein a tapered portion of the second locking member is located between the pivot axis and the end to which the resilient member is connected.

20. A landing gear system as set forth in claim 19, wherein the resilient member is connected between the second locking member and the truck beam.

\* \* \* \* \*